March 12, 1940.   J. W. SMITH   2,193,351
METHOD OF FABRICATING PROPELLER BLADES
Filed Nov. 4, 1937   2 Sheets-Sheet 1
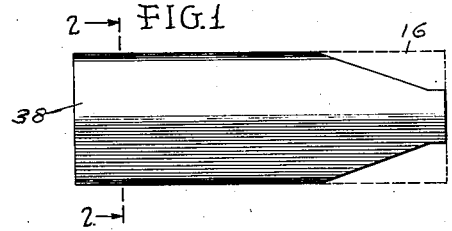
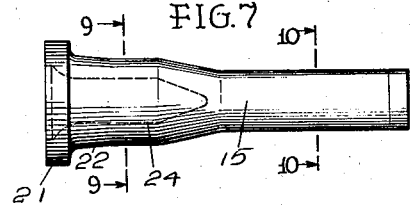
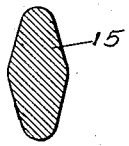
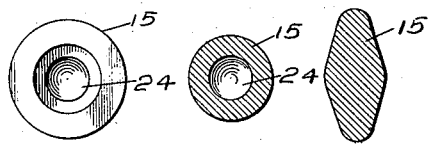
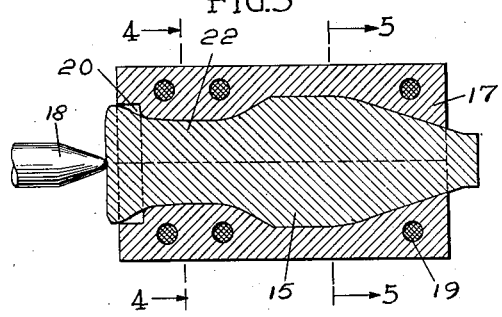
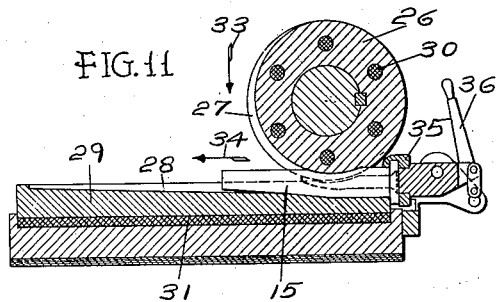
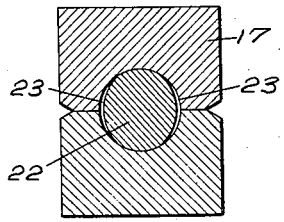
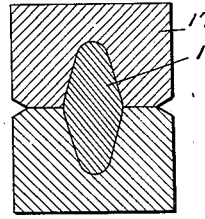
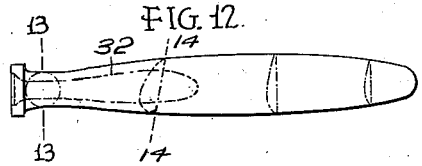
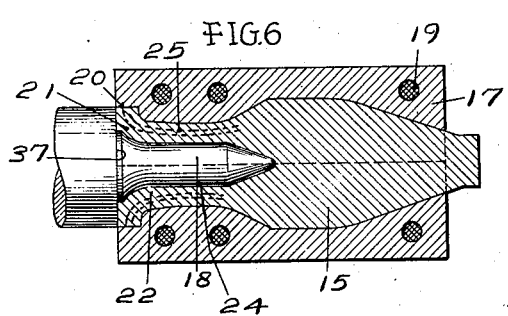
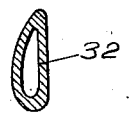
INVENTOR.
JOHN W. SMITH
BY
Herbert S. Fairbanks
ATTORNEY.

March 12, 1940. J. W. SMITH 2,193,351
METHOD OF FABRICATING PROPELLER BLADES
Filed Nov. 4, 1937 2 Sheets-Sheet 2
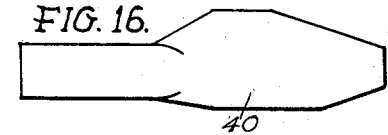
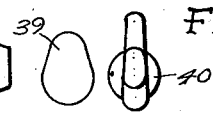
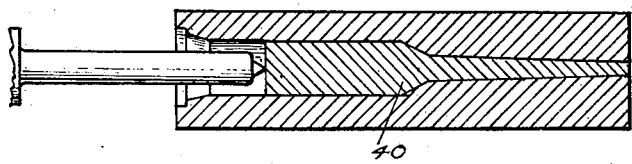
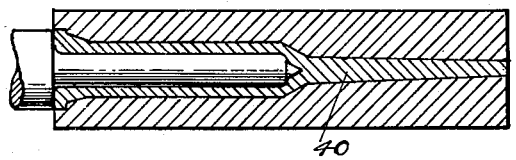
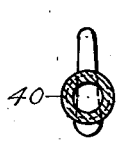
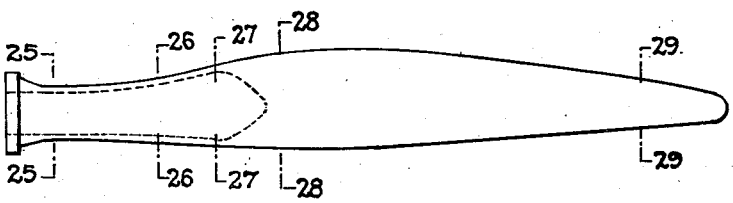
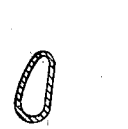
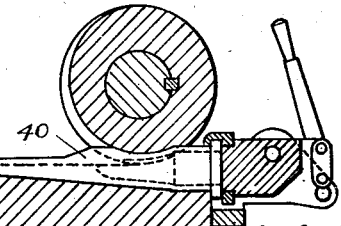
INVENTOR
John W. Smith
BY
Herbert S. Fairbanks
ATTORNEY Patented Mar. 12, 1940

2,193,351

UNITED STATES PATENT OFFICE 2,193,351

METHOD OF FABRICATING PROPELLER BLADES

John W. Smith, Philadelphia, Pa.

Application November 4, 1937, Serial No. 172,702

3 Claims. (Cl. 29—156.8)

This invention relates to the art of fabrication of propeller blades from rolled or extruded rods which have established longitudinal flow lines and desirable physical properties, by rearranging the flow line in the blank to conform to the shank and external flange by employing a swaging, piercing and upsetting operation, thereafter shaping the tubular shank to conform to aerofoil requirements. It is desirable to avoid piercing the shank end after the preparation of the aerofoil section in order to establish certain physical properties and uniform metal distribution.

This invention relates more particularly to a novel method of rearranging the flow lines and metal distribution for the shank end of propeller blades in comparatively short blanks before the distribution of metal for the aerofoil portion has been accomplished. By this method, a hole, preferably round, is pierced or drilled and expanded in a comparatively short blank as a means for securing a desirable distribution of metal by rearranging the flow lines and by deforming the hole to conform to the blade profile. Heretofore, a flattened punch has been proposed which extended into the aerofoil section limiting the width of the hole to the diameter of the punch, thus producing thick and thin distribution of metal. The aerofoil is not, by this method distorted by a piercing operation. By this method, a comparatively large diameter shank flange can be provided.

It is more desirable to rearrange the flow lines for the shank flange in a comparatively short billet.

In accordance with this method, a wide, comparatively short blank is severed from rolled or extruded rods having the required physical properties as set forth in my copending application Serial No. 26,131. This wide, short blank is swaged at the shank by suitable dies which also serve as a gripping means for the piercing operation, thus combining the swaging operation with the piercing operation to rearrange the flow lines in the tubular shank zone.

The gripping and forming dies for aluminum alloys are provided with electrical heating elements, maintaining the required temperature of the blank for rolling, thus completing the fabrication of the blade within the initial heating of the blank.

With the foregoing and other objects in view as will hereinafter clearly appear, my invention comprehends a novel method of fabricating a propeller blade.

It further comprehends a novel method of preparing a tubular shank having a substantially uniform wall thickness by subjecting a comparatively short blank to a swaging, piercing and upsetting operation, and thereafter preparing the aerofoil section by extending the blank in a longitudinal direction, preferably by rolling.

It is a matter of equipment whether the tubular shank is pierced or drilled, whereas swaging, upsetting and rolling are fundamentals.

For the purpose of illustrating the invention, I have shown in the accompanying drawings practical manners of carrying out in practice the steps of my novel method, when an aluminum alloy is used and when steel is used.

Figure 1 is a side elevation of a billet.

Figure 2 is a section, the section being taken on line 2—2 of Figure 1.

Figure 3 is a sectional elevation of a blank swaged to the required shape and ready for piercing.

Figure 4 is a section on line 4—4 of Figure 3.

Figure 5 is a section on line 5—5 of Figure 3.

Figure 6 is a sectional view of the swaging dies, blank and punch after the piercing operation.

Figure 7 is a side elevation of the swaged and pierced blank.

Figure 8 is an end elevation of the blank seen in Figure 7.

Figure 9 is a section on line 9—9 of Figure 7.

Figure 10 is a section on line 10—10 of Figure 7.

Figure 11 is a sectional elevation of the die roller forced into the blank of Figure 7 for a pressing and rolling operation from shank to tip.

Figure 12 is a view of the rolled blade, with predetermined pitch angle for the aerofoil.

Figure 13 is a section on line 13—13 of Figure 12.

Figure 14 is a section on line 14—14 of Figure 12.

Figure 15 is an end elevation of a rolled steel rod.

Figure 16 is a plan view of a steel blank.

Figure 17 is an end elevation of Figure 16.

Figure 18 is an end elevation, showing the aerofoil end of the blank.

Figure 19 is a sectional view of a die with the blank in place and ready to be pierced.

Figure 20 is a view similar to Figure 19, but showing the parts as they appear after the piercing operation.

Figure 21 is an end view, sectioned at the shank, of Figure 22.

Figure 22 is a face view of the blank.

Figure 23 is a sectional elevation of means for rolling the steel blank.

Figure 24 is a face view of a finished blade.
Figure 25 is a section on line 25—25 of Figure 24.
Figure 26 is a section on line 26—26 of Figure 24.
Figure 27 is a section on line 27—27 of Figure 24.
Figure 28 is a section on line 28—28 of Figure 24.
Figure 29 is a section on line 29—29 of Figure 24.

Similar numerals indicate corresponding parts.

Referring to the drawings:

38 designates the required billet cut from a rolled or extruded bar. The dotted line 16, see Figure 1, indicates the amount of metal removed by sawing or otherwise at one end of the billet, to avoid excessive swaging of the metal and thereby eliminate splitting.

The contour of the billet 38, in cross section, is clearly shown in Figure 2.

The blank 15 is subjected to a swaging operation in the gripping and forming dies 17 which swage the blank to the required shape for piercing and upsetting by a punch 18 having an upsetting shoulder 37. The dies 17 are provided with electrical heating elements 19 which maintain the required temperature of the blanks for swaging and piercing. The dies have a space 20 which will be filled by the piercing operation to provide for the formation of a flange 21 on the blank, and the shank 22 has a clearance in the die cavity as shown at 23, see Figure 4. The punch is now actuated to pierce the blank, the outline of the pierced hole being shown at 24, Figure 6.

The rearrangement of flow lines in the shank and flange by swaging and upsetting before the distribution of metal in the aerofoil has been established is indicated by the dotted lines 25 in Figure 6.

The blank is now formed as shown in Figures 7, 8, 9, and 10 and is ready for the rolling operation, attention now being directed to Figure 11. 26 is a die roller having a cavity 27 to form the face side of the aerofoil, and cooperates with a longitudinal die cavity 28 in a die block 29. The die roller is provided with electrical heating elements 30, and the die block 29 is provided with an electrical heating element 31 to maintain the required temperature during the rolling period.

The prepared blank as shown in Figures 6 and 7 is about twenty-eight inches long, and is suitable for rolling a blade seventy-two inches long, see Figure 12, within the initial heating of the blank.

The die roller is forced into the blank, see Figure 11, and the rolling operation is performed by rolling from shank to tip. This forging and rolling operation deforms the round hole 24 to conform to that shown in Figure 14, and the dotted lines 32 in Figure 12. The dotted lines 32 are wider at section lines 14—14 than the diameter of the hole at 13—13, which is an important feature accomplished by preparing a tubular shank on the blank, and has not heretofore been accomplished when preparing the hole after the metal distribution for the blade has been established.

The arrow 33 in Figure 11 indicates the direction of the forging movement of the die roller 26, and arrow 34 indicates the direction of rolling movement of the die roller 26.

The jaws 35 which grip the flange 21 of the blank are controlled by the lever 36.

The billet forms a comparatively short blank elliptical in cross section and having a width approximately equal to the aerofoil, and a thickness less than the diameter of the shank.

The cross sectional area required at the blade tip is about thirty to one less than the shank and about one hundred to one if the shank is not expanded as shown in Figure 6.

This excessive reduction at the aerofoil tip has resulted in splitting the metal as heretofore practiced when rolling a billet of metal into a tapered cone as a means of preparing flow lines, and thereafter die pressing the cone into a finished blade.

The pierced blank, Figure 7, and the finished blade, Figures 12, 13 and 14, represent a typical wall thickness due to piercing a conventional aluminum alloy. The wall thickness for steel would be about seventy five per cent thinner as illustrated in the drawings.

The steel billet 39, Figure 15, is subjected to a forging operation to form a steel blank 40.

The steps in the process for aluminum alloy preparation of the billet in Figure 1, is equivalent to Figure 16 for steel.

Figure 3 is a swaging operation and is equivalent to Figure 19 for steel.

Figure 6 is the upsetting operation combined with a piercing operation for producing the flange forming a thrust bearing seat, and is the equivalent to Figure 20 for steel.

Figure 11 is preferably a rolling operation to finish the aerofoil and give the shank the final shape which blends a round tube into an aerofoil and is the equivalent to Figure 23 for steel.

The pierced hole in both cases may be drilled and machined to control wall thickness before rolling.

In Figure 22, I have shown by dotted lines 41 the machined hole.

It is to be understood all operations for aluminum alloys and steel are performed at the required temperature and the blades are heat treated and finished by conventional system.

The propeller blades constructed in accordance with this method are fabricated with a flange forming a large thrust bearing seat, thereby adapting them to be mounted in the propeller hub as disclosed in my application Serial No. 174,599, filed November 15, 1937.

Figure 1 shows a bar of metal sufficiently wide for the solid aerofoil zone, the cross sectional area being shown in Figure 2.

Figure 15 shows a bar of metal too narrow for the solid aerofoil zone, and Figure 16 shows the blank which has been spread to produce the correct width for the solid aerofoil zone.

Figure 24 shows the aerofoil zone to be solid as at section lines 28 and 29, while at section lines 26 and 27 it is shown that the tubular shank zone is blended into the solid aerofoil zone.

The tubular shank zone and the solid aerofoil zone are also clearly shown in Figure 12.

Having thus described my invention, what I claim as new and desire to secure by Letters Patent is:

1. The method of fabricating propeller blades, comprising forming a bar of metal to establish longitudinal flow lines, contracting the width and flow lines to form a shank zone, thereby establishing a solid aerofoil zone, preparing a tubular shank by piercing and upsetting as a means of preparing and maintaining flow line structure, and rolling from root to tip to form said aerofoil zone into aerofoil contour and to blend the tubular shank zone into aerofoil contour, thereby extending the aerofoil zone in a longitudinal direction as a means of fabricating the bar of metal into finished blade form.

2. The method of fabricating propeller blades, comprising rolling a bar of metal to establish longitudinal flow lines and shaping the bar to a width approximately equal to the aerofoil zone, contracting the width simultaneously with the flow lines to form a shank zone, and establish a solid aerofoil zone, preparing a tubular shank by piercing and upsetting said shank zone as a means of preparing and maintaining flow line structure, and rolling from root to tip to form said aerofoil zone into aerofoil contour and to blend the tubular shank zone into said aerofoil contour, thereby extending the aerofoil zone in a longitudinal direction as a means of fabricating the bar into finished blade form.

3. The method of fabricating propeller blades, comprising extruding a bar of metal to establish longitudinal flow lines and shaping the bar to a width approximately equal to the aerofoil zone, contracting the width simultaneously with the flow lines to form a shank zone, and establish a solid aerofoil zone, preparing a tubular shank by piercing and upsetting said shank zone as a means of preparing and maintaining flow line structure, and rolling from root to tip to form said aerofoil zone into aerofoil contour and to blend the tubular shank zone into said aerofoil contour, thereby extending the aerofoil zone in a longitudinal direction as a means of fabricating the bar into finished blade form.

JOHN W. SMITH.